Figure 2:
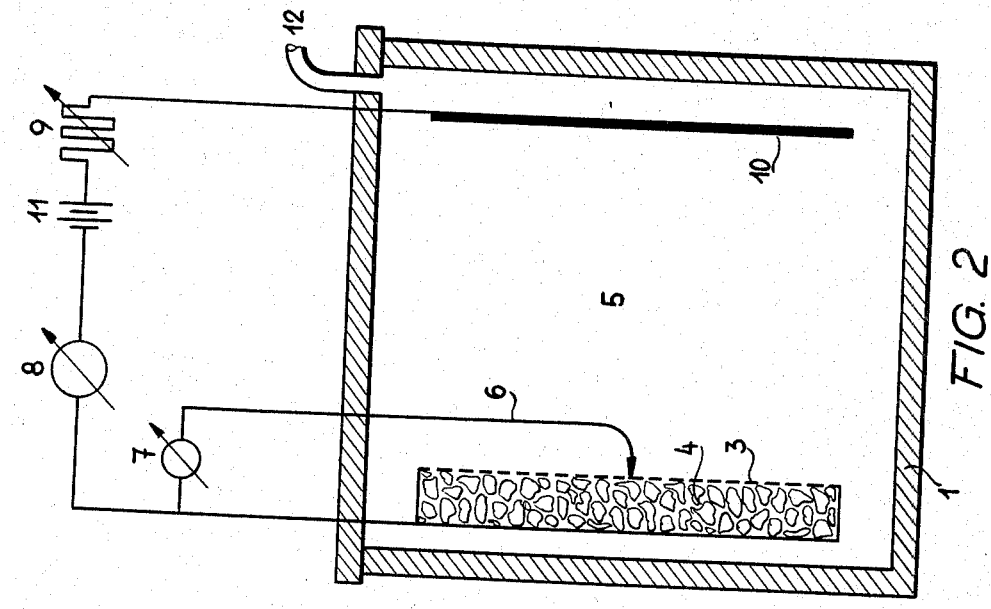

INVENTORS
OTTO HEUSE
MANFRED BOLDT
RUDOLF WIRTZ
BY
Curtis, Morris & Safford
ATTORNEYS 3,316,162
PROCESS FOR ELECTROCHEMICALLY OXIDIZING ω-HYDROXYCARBOXYLIC ACIDS TO α,ω-DICARBOXYLIC ACIDS
Otto Heuse, Kronberg, Taunus, Manfred Boldt, Kelkheim, Taunus, and Rudolf Wirtz, Frankfurt am Main, Germany, assignors to Farbwerke Hoechst Aktiengesellschaft vormals Meister Lucius & Brüning, Frankfurt am Main, Germany, a corporation of Germany
Filed Sept. 27, 1963, Ser. No. 312,087
Claims priority, application Germany, Oct. 3, 1962, F 37,951
5 Claims. (Cl. 204—79)

The present invention relates to a process for electrochemically oxidizing ω-hydroxycarboxylic acids to α,ω-dicarboxylic acids, which comprises introducing a hydrogen solvent anode and a cathode which are electrically interconnected, if desired via an electrical source, into an aqueous solution of an ω-hydroxycarboxylic acid or of the corresponding lactone and maintaining the anode at a potential which is negative by 0.7 to 1.2 volts as compared with a calomel comparison electrode.

The term "hydrogen solvent anode" is here intended to mean an anode that is capable of dehydrogenating the organic substance dissolved in the electrolyte and accumulating the hydrogen removed from the substance. A prerequisite for this is that the electrode should consist of a material that has the quality of a hydrogen activator. As soon as such electrode has a sufficient potential with respect to the electrolyte, part of the accumulated hydrogen giving off an electron passes into solution in the form of a H+ ion. Exemplary of suitable hydrogen solvent anodes are those of Raney nickel, platinum or palladium. To obtain a porous structure having a large surface area, the aforesaid materials are suitably used on a carrier, for example charcoal.

The potential of the hydrogen solvent anode as compared with a calomel electrode shall be within the range of —0.7 and —1.2 volts, advantageously within the range of at least —0.9 and —1.1 volts.

As the cathode for the electrolysis cell of the invention any metal cathode that is resistant to the electrolyte may be used. If a metal sheet cathode is used, part of the oxidation energy must be supplied from the outside in the form of electric energy.

In a particularly advantageous form of the process of the invention, the cathode is an oxygen solvent electrode as it is known from the technique of fuel elements. Such electrodes consist of a porous diaphragm to one side of which gaseous oxygen, for example in the form of air, is supplied, while the other side is wetted by the electrolyte. Suitable materials for the oxygen solvent electrodes are nickel oxide, carbon which has been impregnated with special catalysts, for example spinels, or Raney metals, particularly Raney silver.

The process of the invention enables saturated or unsaturated aliphatic ω-hydroxycarboxylic acids, for example ω-hydroxypropionic acid, ω-hydroxybutyric acid, ω-hydroxycrotonic acid, ε-hydroxycapronic acid, ω-hydroxydecanoic acid, cycloaliphatic ω-hydroxycarboxylic acids, for example hydroxymethylnaphthenic acids, aromatic ω-hydroxycarboxylic acids, for example hydroxymethylbenzoic acid and hydroxymethylnaphthalene-carboxylic acid, and heterocyclic ω-hydroxycarboxylic acids, for example hydroxymethylnicotinic acid, to be dehydrogenated to the corresponding α,ω-dicarboxylic acids. Instead of ω-hydroxycarboxylic acids, the corresponding lactones may be used as starting materials.

As electrolyte, an aqueous, advantageously an aqueous alkaline solution, is used. A 1 to 6 N alkali liquor is particularly advantageous. Preferably a potassium hydroxide solution is used. It is also possible, however, to use a sodium hydroxide solution, lithium hydroxide solution, barium hydroxide solution or milk of lime.

For reasons of economy, the ω-hydroxycarboxylic acid should be contained in the electrolyte in as high a concentration as possible. However, the molar concentration should not exceed half the normality of the lye. It is, of course, possible to work in diluted solutions. The conductivity of the solution should not be below $10^{-2}$ $\Omega^{-1} \cdot cm.^{-1}$.

Since electrochemical processes in fuel cells are independent of the temperature, the process of the invention can be carried out at any temperature at which the electrolyte is in a liquid state. This is of particular advantage for the manufacture of sensitive dicarboxylic acids having a low decomposition point, for example malonic acid. On the other hand, the temperature may be increased up to the boiling point of the electrolyte, if desired under pressure, to increase the solubility of difficultly soluble acids.

The process of the invention has the special advantage that it enables α,ω-dicarboxylic acids to be obtained in a quantitative yield under mild conditions and that substantially no side reactions take place. The advantage of working under mild conditions is particularly important for the manufacture of malonic acid as the latter is difficult to produce by other methods. Another advantage of the process of the invention is that the energy of the exothermic oxidation reaction can be recovered to a large extent in the form of electric energy.

Figure 1:
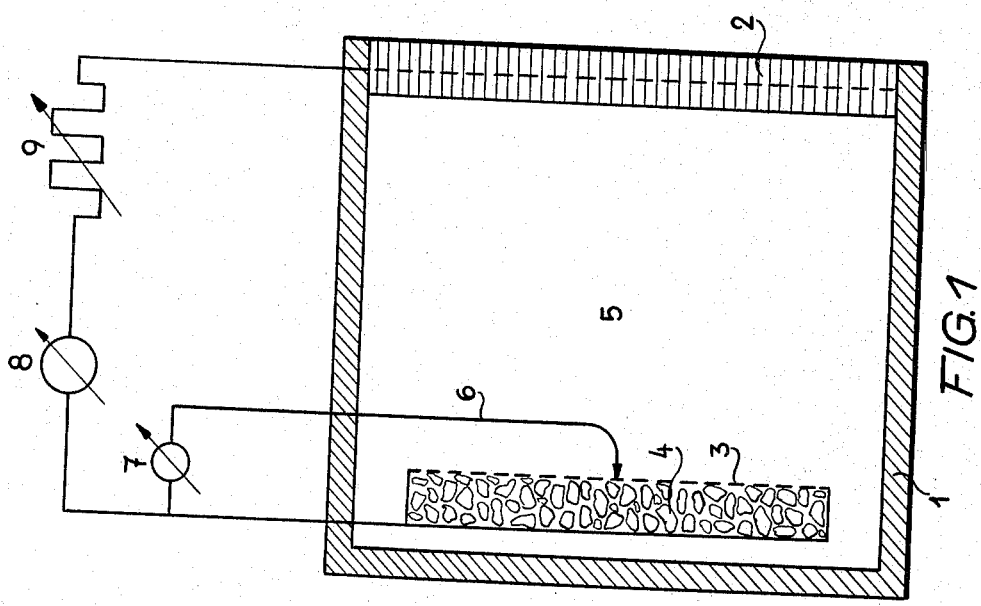

An apparatus suitable for use in carrying out the process of the invention is illustrated diagrammatically by way of example in the accompanying drawings of which: FIGS. 1 and 2 each are longitudinal elevations of the apparatus to be used for the process of the invention.

In FIG. 1, the apparatus consists of vessel 1 of which wall 2 is designed as an oxygen solvent electrode as it is known from the technique of fuel elements. In vessel 1 a perforated container 3 is disposed which is filled with an electrode material 4 having a catalytic action, for example Ni, Pt, Pd. The hollow space of vessel 1 is filled with electrolyte 5. Calomel electrode 6, together with measuring instrument 7, serves to measure the potential between electrolyte 5 and electrode 4. Owing to the electric energy liberated in the course of the reaction, a current flow between the electrodes is produced, which is measured by ammeter 8 and fed to consumer 9.

FIG. 2 shows a modification of the apparatus for carrying out the process of the invention. Instead of or in addition to the apparatus parts shown in FIG. 1, the apparatus of FIG. 2 is provided with nickel sheet cathode 10 and electrical source 11 which supplies the electric energy required for the oxidation in this mode of executing the process of the invention. Opening 12 serves to remove the hydrogen which is formed in the course of the reaction from the cell.

The process of the invention may also be carried out continuously. For this purpose, the electrolyte is passed in known manner through a cell which contains the electrodes described above and enables the electrolyte solution to be recirculated by a pump and the reaction products to be separated continuously.

The following examples serve to illustrate the invention but they are not intended to limit it thereto.

*Example 1*

25.9 grams propiolactone were dissolved in 190 grams 4 N KOH and exposed to the action of a current of 200 milliamperes for 8 days at 25° C. in the cell shown in FIG. 2 of the accompanying drawings. After that time, 17.4 grams malonic acid were determined titrimetrically in the solution.

Example 2

A solution of 25.5 grams propiolactone in 190 grams 4 N KOH was exposed to the action of a current of 100 milliamperes for 15.5 days at 25° C. in the cell used in Example 1. The organic acids were then precipitated with barium chloride. 9.6 grams malonic acid were obtained from the precipitate of the barium salts by decomposition with hydrochloric acid and extraction with ether.

Example 3

4.5 grams 4-hydroxymethyl-benzoic acid were dissolved in 190 grams 4 N KOH and exposed for 7 days at 25° C. to the action of a current of 100 milliamperes. The solution was then acidified. The precipitate which had been formed was extracted with alcohol to remove the residual 4-hydroxymethyl-benzoic acid which had been simultaneously precipitated. 2.07 grams crystalline terephthalic acid remained behind.

Example 4

A current generating cell as shown in FIG. 1 of the accompanying drawings was obtained in the following manner: by impregnation of a carbon diaphragm with a $PdCl_2$ solution and reduction in a stream of hydrogen, a porous palladium electrode with an atomic ratio Pd:C of 1:50 was obtained. The said palladium electrode served as an oxygen solvent electrode (cathode). As the hydrogen solvent electrode, an electrode of Raney nickel suspended in a nickel net was used.

The cell was charged with a solution of 28 grams propiolactone in 200 grams 4 N KOH. It yielded a current of 110 milliamperes at 0.5 volt. After 14 days 13.8 grams malonic acid had formed which were determined titrimetrically.

We claim:

1. A process for electrochemically oxidizing ω-hydroxycarboxylic acids to α,ω-dicarboxylic acids comprising introducing a hydrogen solvent anode and a cathode which are electrically interconnected into an aqueous alkaline solution of an ω-hydroxycarboxylic acid and maintaining the anode at a potential within the range of −0.7 and −1.2 volts as compared with a calomel comparison electrode.

2. The process of claim 1 wherein a hydrogen separation cathode is used as cathode and electric energy is supplied to the system from the outside.

3. The process of claim 1 wherein the cathode is an oxygen solvent electrode.

4. The process of claim 1 wherein a lactone of an ω-hydroxycarboxylic acid is used as starting material.

5. The process of claim 4 wherein propiolactone is dehydrogenated to malonic acid.

References Cited by the Examiner

UNITED STATES PATENTS 3,252,872   5/1966   Conway et al. -------- 204—78

FOREIGN PATENTS 148,801   11/1962   Russia.

HOWARD S. WILLIAMS, *Primary Examiner.*

H. M. FLOURNOY, *Assistant Examiner.*